INVENTORS
WALTER P. SIEGMUND
GREGORY B. GILMORE
BY
ATTORNEY

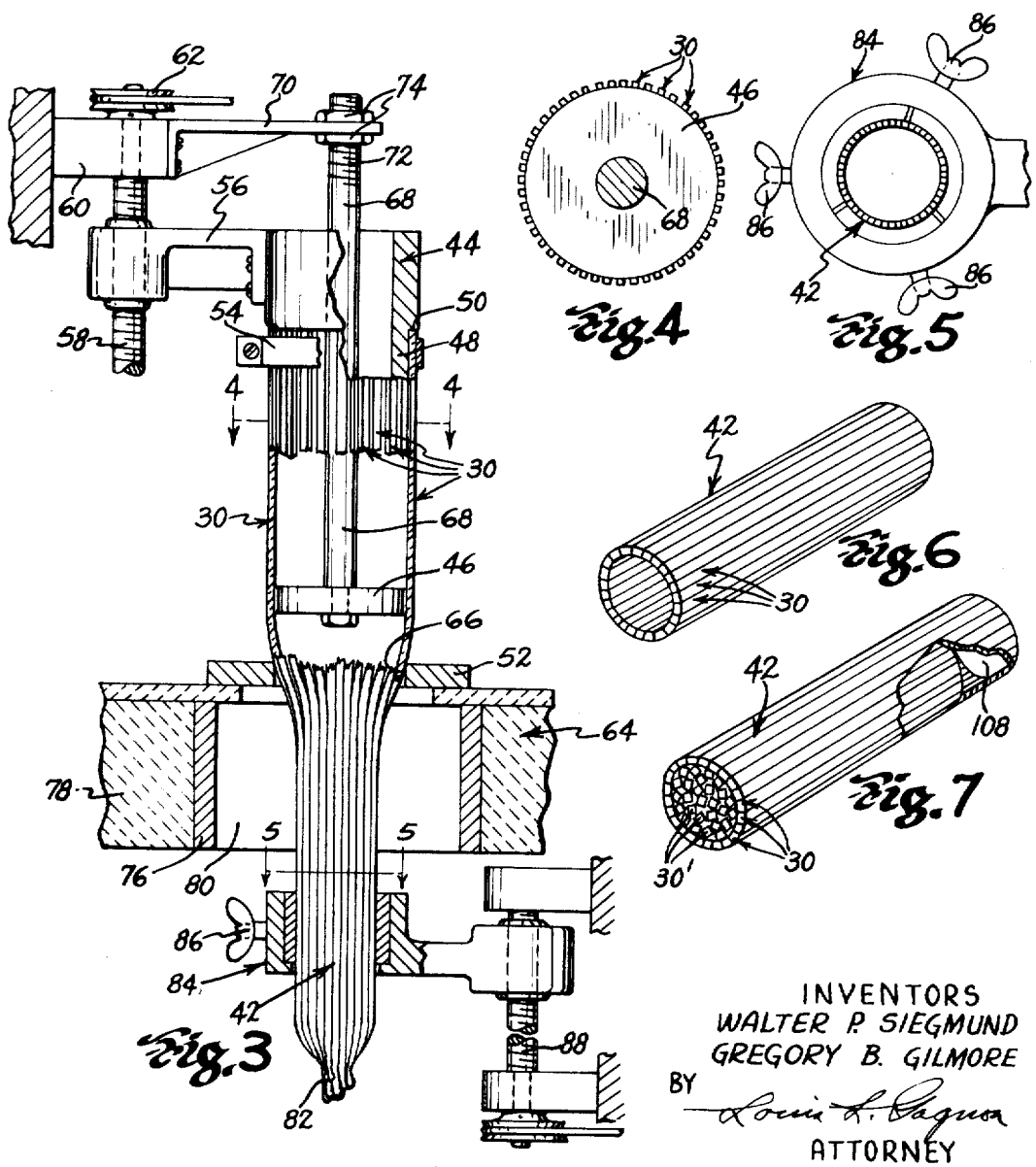
INVENTORS
WALTER P. SIEGMUND
GREGORY B. GILMORE
BY
Louis L. Cagnon
ATTORNEY

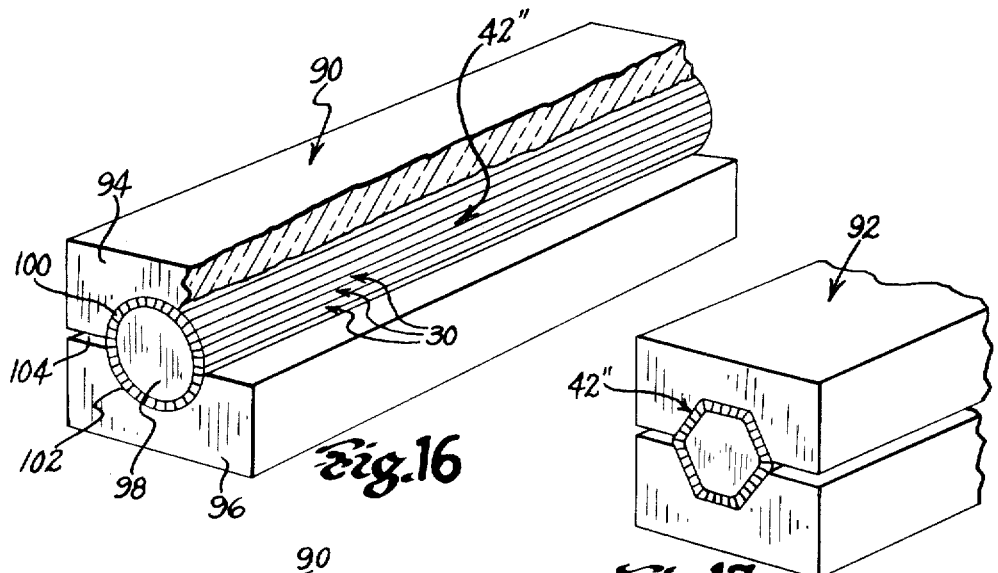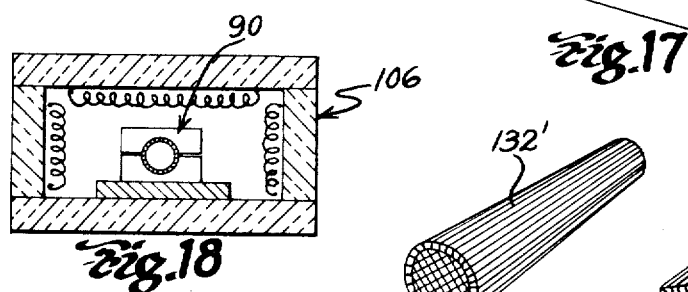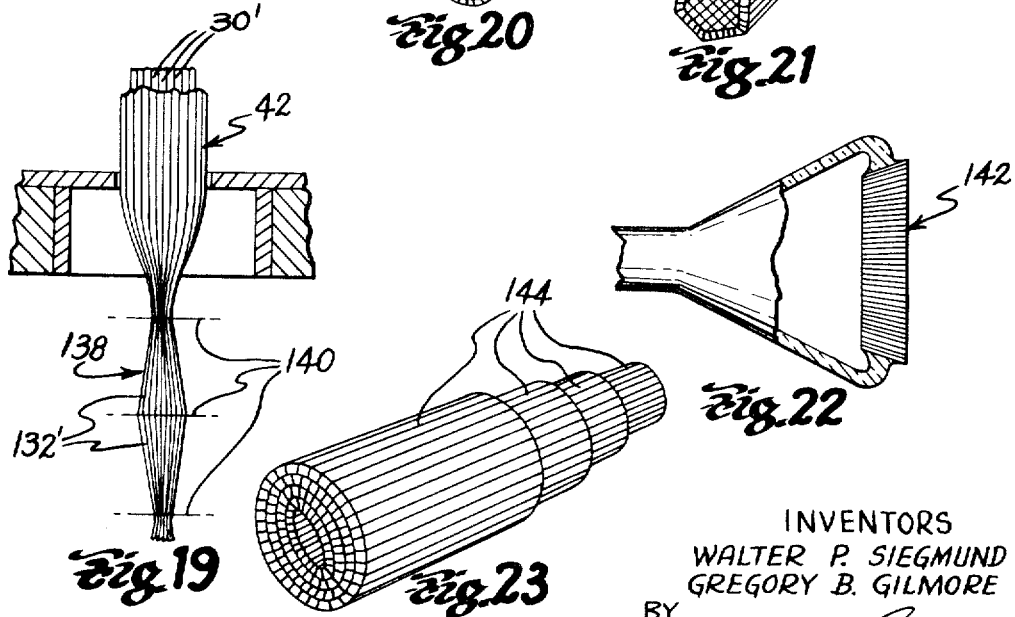

United States Patent Office 3,350,183
Patented Oct. 31, 1967

3,350,183
METHOD OF MAKING ENERGY-CONDUCTING COMPONENTS FORMED OF FIBER ELEMENTS
Walter P. Siegmund, Woodstock, Conn., and Gregory B. Gilmore, Southbridge, Mass., assignors to American Optical Company, Southbridge, Mass., a voluntary association of Massachusetts
Original application Oct. 19, 1961, Ser. No. 146,273. Divided and this application Aug. 16, 1965, Ser. No. 487,648
6 Claims. (Cl. 65—4)

This is a division of application Ser. No. 146,273, filed Oct. 19, 1961, now abandoned.

This invention relates to energy-conducing components formed of a plurality of fused fiber-like energy-conducting elements and method of making the same and has particular reference to the fabrication of tubular members formed of fused energy-conducting fibers and to fiber components embodying such tubular members as portions of their respective structures.

Accordingly, a principal object of the present invention is to provide novel energy-conducting tubular members of the above character, and fused fiber type components embodying such members as portions of their respective structures and method of making the same.

Another object is to provide a tubular member formed entirely of a plurality of individual energy-conducting fibers joined successively, one to another, in fused side-by-side relation throughout their lengths with a first of said fibers being joined to a last in succession thereof to provide the enclosure of said tubular member.

Another object is to form the above tubular member entirely of fibers each having an energy-conducting core section surrounded by a relatively thin integral cladding of heat-softenable material which is selected to be of such character as to prevent at least the major portion of energy transmitted through the respective fiber core sections from straying outwardly through the sides thereof.

Another object in to construct a tubular member of the above character of fibers whose core sections are formed of light-conducting material.

Another object is to construct such a tubular member of fibers whose core sections are formed of electrical-conducting material; or, to construct a tubular member of a preselected and prepositioned number of each of the above-mentioned types of fibers.

Another object is to provide energy-conducting tubular members of the above character whose side walls are substantially vacuum-tight throughout the major portion of their lengths and novel method of making the same.

Another object is to provide means and method for progressively continuously forming a tubular member of the above character directly from a prearranged elongated assembly of initially unattached fiber elements.

Another object is to form tubular members of the above character wherein the individual fiber elements which make up the walls thereof retain their individual energy-conducting identities and the resultant tubular members, in themselves, provide means for transferring energy.

Another object is to utilize a fiber tubular member of the above character as means for supporting a group of individual energy-conducting fibers placed internally thereof and which are to be fused together and to said tubular member throughout their lengths to form a multi-fiber energy-conducting component having a solid cross-section.

Another object is to form a fiber energy-conducting component of the above character wherein the fibers which make up the tubular member and those disposed internally thereof are each substantially geometrically and physically identical to provide the resultant component with substantially uniform and identical energy-transmitting capabilities throughout any cross-section thereof from edge-to-edge.

Another object is to provide energy-conducting components which, when fabricated as mentioned above, may be edge-joined compactly to form larger area energy-transmitting devices with the initial fiber tubular members thereof merged in the resultant structure to provide said devices with a substantially uninterrupted side-by-side arrangement of energy-receiving and transmitting fiber end faces at opposite sides of said device.

Anoher object is to provide tubular fiber members of the above character which are adapted to sustain a vacuum applied internally thereof and by means of which air and gases may be continuously evacuated from interstices between individual fiber elements placed internally of said tubular members as said members and individual fibers are heated to fusing temperatures in the process of forming fiber energy-conducting components of the above character.

A further object is to form a fused multifiber element from an assembly of a plurality of individual energy conducting fiber elements positioned within a tubular member formed solely of similarly characterized energy-conducting fiber elements and having substantially vacuum-tight walls wherein an end of said assembly is heat-sealed and a vacuum is drawn internally of said tubular member to continuously withdraw gases therefrom and cause said tubular member to tend to collapse tightly about the fibers therein when said assembly is heated to the softening and fusing temperatures of the materials thereof.

Other objects and advantages of the invention will become apparent from the following description when taken in conjunction with the accompanying drawings in which:

FIGS. 1 and 2 are greatly enlarged fragmentary perspective views of energy-conducting fibers which are typical of the type used in the practice of this invention;

FIG. 3 is a partially broken away diagrammatic illustration of a preferred procedure and apparatus used to fabricate fiber energy-conducting components in accordance with the invention;

FIGS. 4 and 5 are cross-sectional views taken approximately along lines 4—4 and 5—5 respectively in FIG. 3 looking in the direction indicated by the arrows with certain section lines being omitted therefrom for purposes of clarity.

Figure 8:
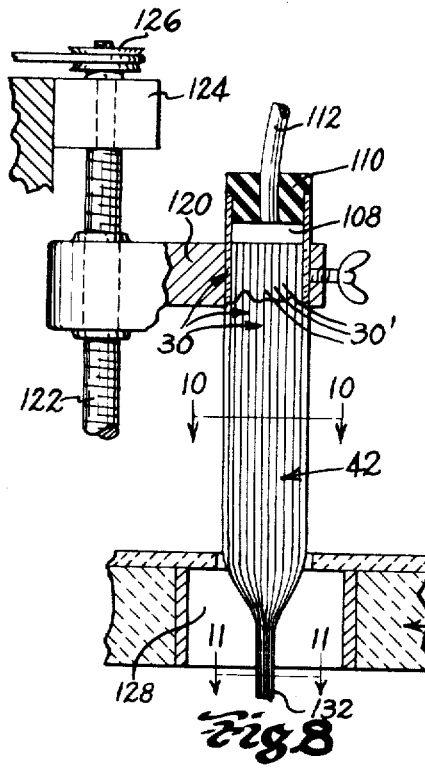
Figure 9:
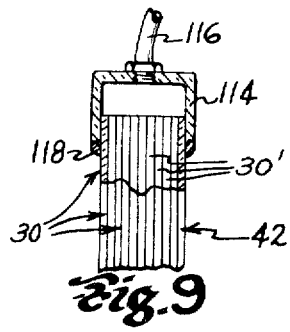
Figure 10:
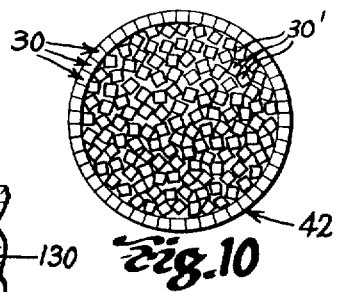

FIG. 6 is a perspective illustration of a fiber energy-conducting tubular member formed in accordance with the invention;

FIG. 7 is a partially broken away perspective view of an initial assembly of a plurality of individual fiber energy-conducting elements placed within said tubular member and from which an energy-conducting component is subsequently formed in accordance with the invention:

FIG. 8 is a diagrammatic illustration of means and method for forming said component;

FIG. 9 illustrates a modification of the apparatus shown in FIG. 8;

FIG. 10 is an enlarged cross-sectional view taken approximately on line 10—10 in FIG. 8 looking in the direction indicated by the arrows and with section lines being omitted therefrom for purposes of clarity;

3

Figure 11:
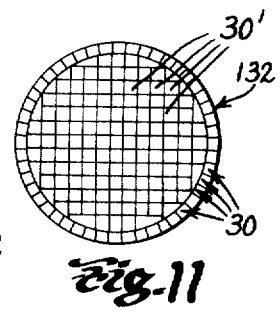
Figure 12:
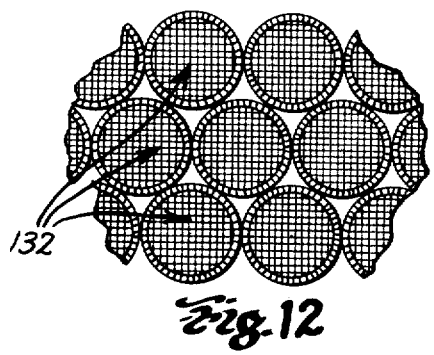
Figure 13:
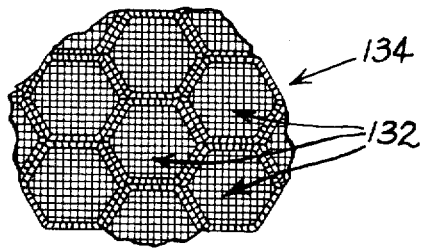
Figure 15:
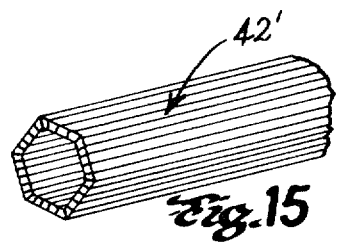
Figure 14:
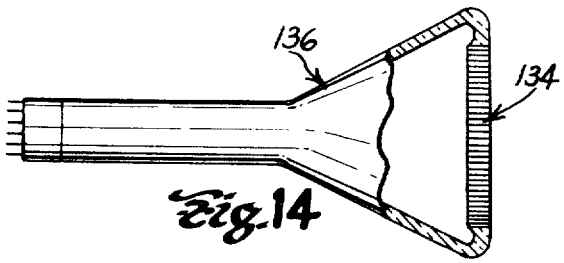

FIG. 11 is a greatly enlarged cross-sectional view taken on line 11—11 in FIG. 8 looking in the direction of the arrows also with section lines being omitted for purposes of clarity;

FIG. 12 is a fragmentary end view of a plurality of unfused fiber energy-conducting components formed in accordance with the invention;

FIG. 13 is a similar view of the same assembly of components in compressed fused relation with each other;

FIG. 14 is a diagrammatic partially broken away side view of an electron tube device embodying in an assembly of fiber energy-conducting components such as shown in FIG. 13 as an integral face part thereof;

FIG. 15 is a fragmentary perspective view of a tubular member like that shown in FIG. 6 but modified in cross-sectional shape;

FIGS. 16, 17 and 18 are illustrations of alternate means and method for fabricating fiber energy-conducting tubular members;

FIG. 19 illustrates a modification of the procedure shown in FIG. 8;

FIGS. 20 and 21 are perspective illustrations of fiber energy-conducting components resulting from the procedure shown in FIG. 19;

FIG. 22 is a diagrammatic illustration of an assembly of components of the type shown in FIGS. 20 or 21 as applied to an electron tube device; and FIG. 23 is a perspective illustration of a further modification of the invention.

In brief outline, the present invention relates to the making of a tube whose walls are formed entirely of a plurality of relatively long and thin glass clad light or electrical energy-conducting fiber elements securely bonded or fused in side-by-side relation with each other to form the tubular configuration. The tube, which might in itself be used as an energy-transmitting member in special cases as it will become apparent hereinafter, may then be filled with individual fibers usually of the same size and character as those which make up the tube. The individual fibers are arranged compactly and as uniformly parallel as possible within the tube so as to extend from one end thereof to a point adjacent its opposite end. One end of the tube is heat sealed and its opposite end is closed off with means through which a suction line is extended into communication with the interior of the tube. A suction is produced in the line which is at least sufficient to provide a pulling force capable of exhausting gases from the interstices between the unfused individual fibers and preferably of such force as to cause the tube to collapse tightly against the fibers and compress the same just prior to fusion thereof when the assembly is heated. The heat sealed end of the assembly is then lowered into a heating zone and heated to a temperature sufficient to render the materials thereof fusible and drawable. With the suction continuously applied at the opposite end of the assembly, the heat-softened end thereof is gripped and drawn axially while the entire assembly is, at the same time, progressively lowered endwise into the heating zone. The rate of lowering of the assembly and the rate of drawing thereof are cooperatively controlled to produce a desired reduction in size of the resultant heated portion of the assembly. The size reduction ratio may be such as to reduce an initial assembly of one or two inches in diameter down to only fractions of an inch in diameter or it may be only sufficient to bring about a tightly fused interfitting relationship of the parts of the assembly without appreciably further reducing its cross-sectional size. In this latter instance, the assembly might simply be progressively lowered through the heating zone without being drawn provided the suction produced internally thereof is sufficient to collapse the tube around the inner fibers tightly enough to cause the fibers to assume a compact interfitting fused relationship or, a slight draw only sufficient to assure complete fusion of all adjoining parts of the assembly might be used.

4

By referring more particularly to the drawings wherein like characters of reference designate like parts throughout the various views, it will become apparent that the fused energy-conducting components of the invention (i.e., the tubular members in FIG. 6 and 15 and/or the structure shown in FIGS. 12, 13, 20 and 21) are all formed of relatively long and thin individual energy-conducting fibers of the general type shown in either FIG. 1 by the reference numeral 30 or in FIG. 2 by the reference numeral 32.

Since the fibers 30 or 32 must retain their individual energy-conducting identities even though they are fused together in the final product of the invention, they each embody claddings 34 and 36 which surround their respective energy-conducting core sections 38 and 40 and serve as energy-insulating means functioning to prevent at least the major portion of energy being transmitted through said core sections from straying outwardly through the respective side walls of the fibers when the fibers are joined by fusion in side-by-side relation with each other.

In FIG. 1 a monofilament type of fiber is illustrated which comprises a single core 38 surrounded by a relatively thin cladding 34. The fiber 32 which is illustrated in FIG. 2 is usually referred to as a "multifiber" in the sense that, while being in itself a single fiber, it contains a plurality of energy-conducting cores 40 whose sides are each completely surrounded by cladding material 36. The terms "monofilament" and "multifiber" will be used hereinafter and when referring to single fiber elements, they are intended to include fiber elements having single clad energy-conducting cores and fiber elements which, in themselves, each embody a plurality of clad energy-conducting cores.

It is pointed out that the fibers 30 or 32 might embody metallic cores 38 or 40 with glass claddings 34 or 36 in the event that an electrical-conducting component is to be fabricated in accordance with the process of the invention. When making light-conducting components, the cores 38 or 40 and claddings 34 or 36 would all be formed of glasses having different preselected indices of refraction and/or light-transmitting characteristics.

For purposes of illustration, the following description will relate more particularly to the fabrication of fused light-conducting components wherein all glass fibers 30 or 32 are used. However, it should be understood that the invention is equally as applicable to the fabrication of electrical energy-conducting components wherein fibers having metallic core parts and glass claddings are used.

A typical light-conducting fiber 30 would embody a core 38 formed of optical flint glass or the like having an index of refraction of approximately 1.66 with a relatively thin cladding of crown type or soda lime glass having an index of refraction of approximately 1.52. A cladding to core thickness ratio of approximately 1 to 10 respectively is generally suitable for most purposes of providing an adequate light-insulating effect in a fused assembly of optical fibers of the above character. This ratio, however, may be deviated from to provide thicker or thiner claddings in accordance with the particular types and indices of glasses used in the construction of optical fibers. It is pointed out that the fibers 30 or 32 might also be provided with core parts 38 or 40 formed of special glasses characterized to be primarily transmissive to selected regions of the spectrum and the claddings 34 or 36 may be formed of glasses having controlled light-absorbing or other special characteristics. In all cases, the cladding and core glasses must have compatible melting temperatures and coefficients of expansion.

The monofilament type of fibers 30 may, for example, be formed by placing a rigid heat-softenable rod-like member of energy-conducting material within a tubular member of heat-softenable material wherein the materials of the rod and tube members are of the character desired of the respective core and clad parts of the fibers and the assembly of the members is heated and drawn to a fiber size. Alternatively, similar materials might be heated to flowable conditions and extruded simultaneously, one surrounding the other, to form fiber-like elements such as 30. These techniques are set forth in detail in Patent Nos. 2,980,957 and 2,992,517 respectively and it should be understood that other suitable fiber forming processes might be used. Multifibers such as 32 are formed by drawing a bundle of clad monofilament fibers, as a unit, down to a fiber size. A method of making this latter type of fiber is shown, for example, in Patent No. 2,992,516.

While multifibers such as 32 might be used in the construction of the fiber tube of the invention and also as means to fill the tube in forming the above-mentioned component having a solid cross-section or the tube may be formed of multifibers with monofilaments used to fill the same or vice versa, the following description will deal only with the use of monofilaments such as 30 for ease of illustration. It should be understood, however, that any or all portions of the structure hereinafter described may be formed of multifibers. Also, while it is most convenient to form the fiber tube of the invention of fibers having square cross-sections as shown in FIG. 1, it is pointed out that fibers having other rectilinear or circular cross-sectional shapes may be used.

In a first phase of the invention, the fiber tube 42 which is shown in FIG. 6 is preferably formed by a process which is referred to in the trade as "drusing" and which is shown in FIG. 3. In this aspect, a plurality of fibers 30 having been preselected as to shape and size are mounted exteriorly upon a tubular adaptor 44 and the group thereof is supported interiorly by a plug 46 depending through the adaptor 44. The fibers 30 are selected to be of such a cross-sectional size and length as to be relatively easily handled and characteristically spring-like so as to have a tendency to normally remain substantially straight and resist any appreciable amount of bending particularly over relatively short sections of their lengths. While fibers suitable for the purposes of this invention may range considerably in cross-sectional sizes and lengths, it has been found that fibers having diameters or average cross-sectional dimensions of approximately from .050 to .070 of an inch and in lengths of from approximately 8 to 24 inches are the most practical.

The adaptor 44 is of an outer diameter greater than that desired of the finally formed tube 42 and is preferably provided with a reduced shouldered portion 48 to which one end of each of the fibers 30 is attached. The shoulder 50 provides means against which the fibers are abutted thereby preventing longitudinal displacement or slippage thereof on the adaptor when they are forced downwardly through a drusing plate 52 which will be described in detail shortly. The fibers 30 are arranged peripherally about the adaptor 44 preferably in approximately equally spaced relation with each other and secured to the adaptor 44 with a clamping band 54 or, alternatively, taped, cemented or secured in place with an epoxy or the like. The adaptor 44 is provided with a laterally extending supporting arm 56 through which is threaded a vertically disposed lead screw 58 supported for rotation in a stationary bracket 60. The lead screw 58 is driven rotationally by a pulley and belt arrangement 62 or the like which is connected to an electric motor or any suitable conventional driving means not shown. Rotation of the lead screw in the proper direction causes the assembly of fibers 30 to be lowered through the drusing plate 52 and thence into the heating zone of a furnace 64. The drusing plate is provided with an opening 66 therethrough of a size somewhat smaller than the outer peripheral dimension of the portion of the adaptor 44 to which the fibers 30 are attached so that, in passing through the opening 66, the fibers 30 are sprung inwardly toward each other with an inwardly directed force at their point of engagement within the furnace.

This point of engagement is located at a position in the furnace 64 where the fibers 30 are heated but have not quite reached fusing temperatures and are still resilient enough to exert forces against each other and thereby form a tight tubular assembly which, in progressing on through the furnace becomes tightly and securely fused. Control of the related sizes of the opening 66, peripheral dimension of the bundle of fibers and the position of the plug 66 relative to the drusing plate 52 determine the location of the initial point of engagement of the fibers 30 within the furnace 64. The plug 46, which is of a diameter approximately equal to the diameter of the shouldered portion 48 of the adaptor 44, holds the fibers outwardly to the point where it (the plug 46) is located above the drusing plate 52. In this way, a relatively sharp bend is produced in the fibers 30 as they pass the plug 46 and enter the opening 66 in the plate 52. Upon coming into engagement with each other within the furnace, the fibers 30 inherently must reverse their bend and continue on straight downwardly in firm engaging relation with each other and it is the springing action of the fibers that produces a compressing or tightening force on the assembly which assures secure and tight fusion.

The plug 46 is fixedly supported at a desired distance above the drusing plate 52 by means of a rod 68 which depends from a stationary bracket 70 substantially coaxially through the adaptor 44 and assembly of fibers 30. The rod 68 is threaded at 72 where it passes through the bracket 70 for purposes of making the initial adjustment of the level of the plug relative to the drusing plate 52. Clamp nuts 74 are provided to secure the rod 68 in a desired adjusted position.

The furnace 64 embodies an electrical resistance heating element 76 which encircles the fiber assembly and is supported in a stationary insulating block 78 or the like. The heating zone 80 of the furnace is of such a size as to provide ample clearance between the fiber assembly and element 76.

With fibers 30 formed of the above-mentioned 1.66 index flint and 1.52 index soda lime or crown type glasses, a temperature of approximately 155° F. or from 1500° F.–1600° F. is produced in the heating zone 80 adjacent the fiber assembly so as to heat the fiber assembly to a temperature approaching that of the furnace. In order to begin the operation of forming the fiber tube 42, the depending end of the assembly of fibers 30 is forced through the drusing plate 52 into the heating zone 80 and held there for a time period sufficient to fully soften and fuse the fibers 30 together whereupon the fully softened and fused end of the fiber assembly, which appears somewhat as illustrated by reference numeral 82 (FIG. 3) is baited and pulled downwardly through an annular chuck or the like 84 wherein it is clamped with suitable means such as the clamp screws 86.

To bait the heat-softened assembly of fibers while it is in the heating zone, one simply passes a rod of glass having a melting temperature approximately equal to that of the fibers 30 upwardly through the chuck 84 into endwise engagement with the heat-softened end of the assembly of fibers and when the baited rod becomes fused to the fibers 30, it is pulled downwardly carrying the fiber assembly into the chuck 84 where it is clamped as shown and the baited rod is broken away from the end 82.

The process of forming the fused fiber tube 42 then continues by simultaneously lowering the assembly of fibers 30 into the heating zone 80 at a controlled relatively slow rate by operation of the lead screw 58 while the chuck 84 is lowered at a controlled more rapid rate. The chuck 84 is motivated by a rotatably driven lead screw which operates in a manner identical to the lead screw 58. The differences in feed rates produced by the lead screws 58 and 88 are preferably controlled to be only sufficient to produce a slight drawing effect upon the fiber assembly which assists along with the drusing or springing together of the fibers to form an air or vacuum-tight fused joinder between each and every fiber of the resultant fused fiber tube 42. More rapid drawing rates, however, will reduce the diametrical size of fiber tubes and, if desired, a tapered tube 42 may be formed by beginning with a relatively rapid drawing rate and gradually reducing the rate of drawing or vice versa. Other progressively variable drawing rates may be used to accordingly produce different tubular configurations.

It is pointed out that while the tube 42 is shown in FIGS. 3 and 6 as being circular in cross-sectional configuration, it may be formed hexagonal as shown by the reference numeral 42' in FIG. 15 or to any other desired shape simply by providing an adaptor 44, plug 46 and opening 66 in the drusing plate 52 having the desired hexagonal or other configuration.

The tube 42 which is shown in FIG. 6 as having square-cut opposite ends is cut from the drawn fiber assembly in FIG. 3 to remove both the baited end 82 thereof and the unused portion of the assembly of fibers adjacent the adaptor 44 which, obviously, cannot pass through the drusing plate 52. If an exceptionally long initial fiber assembly is used in FIG. 3 so as to produce an exceptionally long fused tubular structure, several fiber tubes like that shown in FIG. 6 may be cut from the resultant tubular structure.

Before proceeding to describe a second phase of the invention wherein fiber components having solid fiber cross-sections are formed by using fiber tubes of the above character, it is pointed out that fiber tubes 42'' or 42''' (FIGS. 16–18) like the tube 42 in FIG. 6 may be formed by the alternate technique shown in FIGS. 16, 17 and 18. This process comprises providing molds formed of refractory material such as, for example, graphite or any of the commonly known refractories used in glass forming or molding processes and which are substantially geometrically and physically stable under glass fusing temperatures.

The molds 90 and 92 in FIGS. 16 and 17 respectively are substantially identical with the exception that the mold 90 is used to form fiber tubes having circular cross-sections while the mold 92 is used to form fiber tubes having hexagonal cross-sections like the tube 42' in FIG. 15. The mold 90 embodies upper and lower halves 94 and 96 respectively and a core section 98 all of which are formed of refractory material. Semi-circular channels 100 and 102 are provided longitudinally across the respective mold halves 94 and 96 whose radii of curvature are of the outer radial dimension desired of the fiber tube to be formed therein and the cylindrical core 98 is approximately of a diameter equal to that desired of the inner dimension of said fiber tube which is to be formed in the mold 90. The thickness of the fibers 30 which are to form the fiber tube determine the differences in cross-sectional dimensions of the respective channels 100, 102 and the core 98.

In making the fiber tube 42'', the fibers 30 are laid up in the channel 102, the core is placed over the same and other fibers 30 are then arranged to cover the remaining portion of the core whereupon the upper mold half is placed over the fibers 30 to complete the assembly in FIG. 16. The mold halves 94 and 96 are so constructed as to provide a slight clearance 104 therebetween in the final assembly which, when the assembly is heated sufficiently to soften and fuse the glasses of the fibers 30, will allow the upper mold half to settle down upon the fibers and compress the same slightly to form a tight fused joinder therebetween. It should be understood that the mold 90 might, alternatively, embody more than two outer sections and it might also be compressed mechanically while being heated.

The assembly of the mold 90 and fibers 30 is placed in a furnace 106 to fuse the fibers 30 together and thereby form a fused tubular structure similar to that shown in FIG. 6.

The mold 92 in FIG. 17 is functionally identical to the mold 90 and, as it is obvious from the drawings, it is used to form hexagonal fiber tubes. Holds for producing fiber tubes of shapes other than those shown are formed by providing channels 100 and 102 and cores 98 of appropriately different shapes.

The above-mentioned second phase of the invention comprises filling a fused fiber tube 42 (FIG. 7), which has been formed by any one of the above techniques, with a plurality of fibers 30' which are preferably identical to the fibers 30 of the finished tube 42. The fibers 30', however, may be larger or smaller than the fibers 30 and/or they may be either multifibers or monofilaments.

In any case, the fibers 30' are packed as tightly as possible within the fiber tube 42 and in substantially parallel relation to each other. They may be of a length such as to completely fill the tube 42 from end to end or arranged as shown in FIGS. 7 and 8 so as to leave an unfilled space 108 at one end thereof. In this latter instance, the open end of the tube is sealed with a stopper or the like 110 having a suction line 112 extending therethrough while, in the former case where the tube 42 is filled completely with fibers 30', the tube 42 is potted in a holder 114 having a suction line 116 communicating thereinto. An epoxy 118 or the like may be used to seal and attach the holder 114 to the fiber tube 42.

The assembly of the fiber tube 42 and fibers 30', with one of its ends sealed and provided with a suction line 112 or 116 communicating internally thereof and the other end flame-sealed (as in a test tube) or otherwise heat-sealed, is then clamped in a supporting arm 120 adjacent its upper sealed end so as to depend therefrom. Through the arm 120 there is threaded a vertically disposed lead screw 122 which is journaled in a stationary supporting bracket 124. The lead screw 122 is rotated by a power-driven pulley 126 so as to cause the arm 120 to traverse the lead screw 122 and cause the assembly of the fiber tube 42 and fibers 30' to be lowered through the heating zone 128 of a furnace 130 which is similar to the furnace 64 described hereinabove.

The temperature in the heating zone 128 is controlled to be sufficient to heat the fiber assembly to a fusing and drawing temperature as it is directed therethrough and for fibers 30 and 30' which are formed of the above-given examples of glasses, a temperature of approximately 1550° F. would be appropriate. The depending end of the fiber assembly is then lowered into the heating zone 128 and, when fully heat-softened, it is baited and drawn down in the manner of baiting described above with relation to the forming of the fiber tube 42. At the same time, a suction is produced in the line 112 by means of any conventional suction pump or so-called vacuum pump not shown. By reason of the fact that the fiber tube 42 is formed to have vacuum-tight side walls as mentioned above, a vacuum effect will be produced within the tube 42 which will tend to collapse the portion of the tube which becomes heat-softened in the heating zone 128 and thereby compress the fibers 30' therein while, at the same time, the suction will evacuate air and gases from the interstices between the fibers 30 to assure a clean, substantially bubble-free fused joinder therebetween in the finally-drawn fiber structure to be described shortly. A suction capable of reducing the pressure inside the fiber tube 42 to at least one-half an atmosphere is preferred.

With the fiber assembly baited and the suction line in operation, the fiber assembly is lowered relatively slowly through the heating zone 128 while its depending end is drawn at a more rapid precontrolled rate such as to form the resultant fused fiber component 132 (see FIG. 11) to a desired cross-sectional size.

As an example, a fiber tube 42 which is initially approximately 2 inches in diameter and, in itself, formed of fibers 30 each having a diameter of approximately .010 of an inch with fibers 30' therein of approximately the same size might be drawn at a rate approximately 400 times faster than it is lowered into the furnace 130 to produce approximately a 20 to 1 reduction in size thereof wherein, in the drawn component 132, the individual element or fiber size throughout the entire cross-section would be approximately .0005 inch and the diameter of the component itself would be approximately .100 inch.

As it can be seen in the greatly enlarged cross-section of FIG. 11, the entire component 132 is formed solely of individual light-conducting fibers and, therefore, throughout any portion of its length and completely across any cross-section thereof, it will conduct and transfer light through all of the core parts of the fibers 30' and those of the fibers 30 which make up its structure. The structure 132 is tightly and completely fused throughout its length and width.

It is pointed out that the above-mentioned 20 to 1 reduction ratio in size is only given for illustrative purposes, that is, the size reduction ratio from the initial tube and fiber assembly to the component 132 might be greater or less than 20 to 1 and actually a minimum size reduction ratio only sufficient to fully compact the fibers 30' might be provided. In such a case, the initial assembly of the tube 42 and fibers 30 need not actually be drawn at all if a suction is applied internally thereof which is sufficient to fully collapse the fiber tube 42 and compact the fibers 30' as it passes through the heating zone 128 or it may be drawn an amount only sufficient to assure complete fusion without an appreciable reduction in the sizes of the individual fibers 30 or 30'.

The fused fiber component 132 may be cut transversely into relatively short predetermined lengths which might then be assembled as shown in FIG. 12 and fused together under heat and pressure to form a large area energy-transmitting plate 134 (FIG. 13). The plate 134, as shown in FIG. 14, might be used as the image-receiving and transmitting face of a cathode ray tube 136. The components 132 would, however, have an unlimited number of other uses either individually or assembled as shown in FIG. 13.

It is specifically pointed out that the components 132 are formed only of energy-conducting fibers and although the fibers 30' are surrounded by a tubular jacket, the tubular jacket is, unlike conventional fiber structures of this nature, comprised entirely of energy-conducting fibers and is equally as adaptable to conducting energy as any other portion of the components 132. Furthermore, when a plurality of the components 132 are assembled together in side-by-side relation, the entire area of the resultant plate-like structure will conduct energy uniformly without any non-conducting boundaries between the secured-together components.

Referring now to FIGS. 19 and 20, it can be seen that tapered fiber components 132' can be formed from the assembly of the fiber tube 42 and fibers 30' simply by controllably varying the rate at which the assembly is drawn to form the elongated fused configuration 138 which is subsequently cut transversely approximately at lines 140 to form the components 132'. Again, it is pointed out that the configuration of the assembly of the fiber tube 42 and fibers 30' might be other than circular. For example, the assembly might be hexagonal with the result that hexagonal components 132 would be formed when the assembly is drawn and cut as shown in FIG. 19. In FIG. 21 a tapered hexagonal component 132" is shown.

These tapered components 132' or 132", when assembled together in the manner described with relation to FIGS. 12 and 13, would produce a tapered plate-like structure 142 (FIG. 22). The plate 142 is shown in FIG. 22 as being utilized as a cathode ray tube energy-conducting face.

Also, a plurality of fiber tubes 144 of different sizes might be assembled in telescopic fashion as shown in FIG. 23 and fused together if it is desired to produce a fiber energy-conducting assembly having a cross-section of fibers arranged in concentric ring-like patterns.

It is further pointed out that the temperatures which were given above for purposes of illustration are arbitrary and, as it is well known in the art, fiber fusing temperatures may range from below 1000° F. to above 1600° F. and while proper fusing and drawing temperatures are related to the characteristics of the particular glasses to be fused, they are also determined in accordance with the pressures applied to the glasses by the suction or vacuum effect and/or the act of drawing. In general, fusion of heat-softened glass parts can be accomplished at lower temperatures when pressure is applied to force said glass parts together while the same glass parts require higher temperatures for fusion without pressure. While the above-given fusing and drawing temperatures relate more specifically to the particular examples of glasses set forth herein under the conditions relating to the process of this invention, it should be understood that other glasses might be used and, in such instances, they might require higher or lower temperatures in accordance with the known characteristics of such glasses. Technical information is available which gives the temperatures of softening, melting and annealing of commercial glasses, all of which may be used in the present invention. Therefore, the various specific temperatures for all glasses adapted for use in the process of this invention are not set forth herein.

From the foregoing, it can be seen that simple and efficient means and method have been provided for accomplishing all of the objects and advantages of the invention. Nevertheless, many changes in the details of construction, arrangement of parts or steps in the method may be made without departing from the spirit of the invention as expressed in the accompanying claims and the invention is not to be limited to the exact matters shown and described as only preferred matters have been given by way of illustration.

Having described our invention, we claim:

1. The method of making a multiple fiber energy-conducting device for receiving and conducting in an annular pattern a multiplicity of image elements and which is capable of enclosing additional energy-conducting means comprising the steps of positioning a multiplicity of resilient substantially straight individually glass clad energy-conducting fibers in adjacent substantially parallel side-by-side relationship with each other in the form of a hollow array having corresponding opposite ends of the fibers respectively disposed in an annular pattern, forcing said fibers tightly against one another and heating the same to a temperature of sufficient intensity to induce fusion of one to the other to form a unitary tubular structure which constitutes said device.

2. The method as recited in claim 1 wherein said steps of forcing said fibers tightly against one another and heating respectively involve springing said fibers radially toward the center of said array progressively from one end toward the other thereof and applying said heat in a zone encircling said array progressively along the length thereof following said springing.

3. The method as recited in claim 2 further including the step of drawing said array longitudinally to a reduced cross-sectional size simultaneously with said steps of springing and heating.

4. The method as recited in claim 1 further including the steps of placing longitudinally within said unitary tubular structure a number of additional glass clad energy-conducting fibers and heating the combination sufficiently to fuse said tubular structure and additional fibers together as a unit.

5. The method as recited in claim 4 including the step of drawing said heated combination longitudinally to a reduced cross-sectional size.

6. The method as recited in claim 1 wherein said steps of positioning, forcing and heating respectively involve arranging said fibers circumferentially about a rigid core section of mold means including a number of cylindrically channeled outer sections, pressing at least one of said outer sections toward said core section against said fibers to effect said forcing of said fibers tightly against one another, heating the arrangement of said mold means and fibers sufficiently to fuse said fibers into said unitary structure and removing said structure from said mold means.

References Cited

UNITED STATES PATENTS

| | | |
|---|---|---|
| 1,751,584 | 3/1930 | Hansell. |
| 1,926,552 | 9/1933 | Morgan. |
| 2,619,438 | 11/1952 | Varian et al. |
| 2,752,731 | 7/1956 | Altosaar. |
| 2,608,722 | 9/1952 | Stuetzer. |
| 2,992,516 | 7/1961 | Norton. |
| 3,148,967 | 9/1964 | Hicks _____ 65—4 |
| 3,193,363 | 7/1965 | Hicks et al. _____ 65—4 |
| 3,216,807 | 11/1965 | Woodrock _____ 65—4 |
| 3,278,283 | 11/1966 | Bazinet _____ 65—4 |

DONALL H. SYLVESTER, *Primary Examiner.*

S. LEON BASHORE, *Examiner.*

F. W. MIGA, *Assistant Examiner.*

UNITED STATES PATENT OFFICE
CERTIFICATE OF CORRECTION

Patent No. 3,350,183                            October 31, 1967

Walter P. Siegmund et al.

It is hereby certified that error appears in the above numbered patent requiring correction and that the said Letters Patent should read as corrected below.

Column 1, line 39, for "in" read -- is --; column 3, line 11, strike out "in"; column 6, line 41, for "155°" read -- 1550° --; column 8, line 5, for "Holds" read -- Molds --.

Signed and sealed this 11th day of February 1969.

(SEAL)
Attest:

Edward M. Fletcher, Jr.                        EDWARD J. BRENNER
Attesting Officer                              Commissioner of Patents